US008929426B2

(12) United States Patent  (10) Patent No.: US 8,929,426 B2
Sakamoto  (45) Date of Patent: Jan. 6, 2015

(54) COMMUNICATION DEVICE AND ORTHOGONAL-ERROR CORRECTION METHOD

(75) Inventor: Takenori Sakamoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 13/818,629

(22) PCT Filed: Sep. 9, 2011

(86) PCT No.: PCT/JP2011/005083
§ 371 (c)(1),
(2), (4) Date: Feb. 22, 2013

(87) PCT Pub. No.: WO2012/035733
PCT Pub. Date: Mar. 22, 2012

(65) Prior Publication Data
US 2013/0163656 A1  Jun. 27, 2013

(30) Foreign Application Priority Data

Sep. 13, 2010  (JP) ................. 2010-204286

(51) Int. Cl.
H04B 3/46  (2006.01)
H04B 17/00  (2006.01)
H04Q 1/20  (2006.01)
H04L 1/20  (2006.01)
H04L 27/36  (2006.01)
H04L 27/38  (2006.01)

(52) U.S. Cl.
CPC .............. H04L 1/206 (2013.01); H04L 27/364 (2013.01); H04L 27/3809 (2013.01); H04L 27/3863 (2013.01)
USPC .......................................... 375/226; 375/219

(58) Field of Classification Search
USPC .................................. 375/226, 219
See application file for complete search history.

(56) References Cited

U.S. PATENT DOCUMENTS

| 5,388,127 | A | * | 2/1995 | Scarpa ........................... 375/376 |
| 7,778,354 | B2 | | 8/2010 | Yamaguchi et al. |
| 2004/0240588 | A1 | * | 12/2004 | Miller ............................ 375/340 |
| 2008/0025435 | A1 | * | 1/2008 | Yamaguchi et al. .......... 375/298 |
| 2012/0003951 | A1 | * | 1/2012 | Kawaguchi ................... 455/337 |

FOREIGN PATENT DOCUMENTS

| JP | 2004363757 A | 12/2004 |
| JP | 2008022243 A | 1/2008 |

OTHER PUBLICATIONS

International Search Report dated Nov. 8, 2011, for corresponding International Application No. PCT/JP2011/005083, 2 pages.

* cited by examiner

Primary Examiner — Michael Neff
Assistant Examiner — Nader Bolourchi
(74) Attorney, Agent, or Firm — Seed IP Law Group PLLC

(57) ABSTRACT

By a simple computation, orthogonal errors from an orthogonal modulator and an orthogonal demodulator are separately corrected. Based on the amplitude of a demodulated signal, an orthogonal-error detection unit (320) detects orthogonal errors from an orthogonal modulation unit (140) and an orthogonal demodulation unit (230). Specifically, according to the distribution of transmission signal points on an I-Q plane, demultiplexers (321 and 322) in an orthogonal-error detection unit (320) separate a demodulated signal into a signal on the I-axis and a signal on the Q-axis. Zero-crossing detection units (325 and 326) detect the amplitudes of the separated signals at the intersection of the I- and Q-axes. The orthogonal-error detection unit (320) detects the orthogonal errors based on results from comparing the amplitudes at said intersection. A gain control unit (330) controls settings for a transmission orthogonal-error correction unit (120) and reception orthogonal-error correction unit (250) according to the detected orthogonal errors.

8 Claims, 15 Drawing Sheets

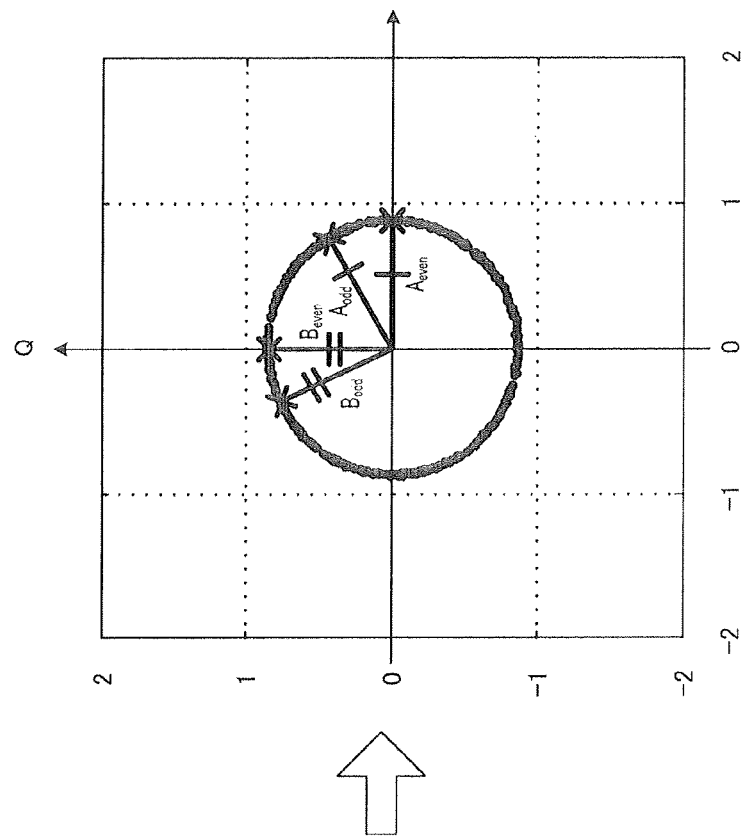
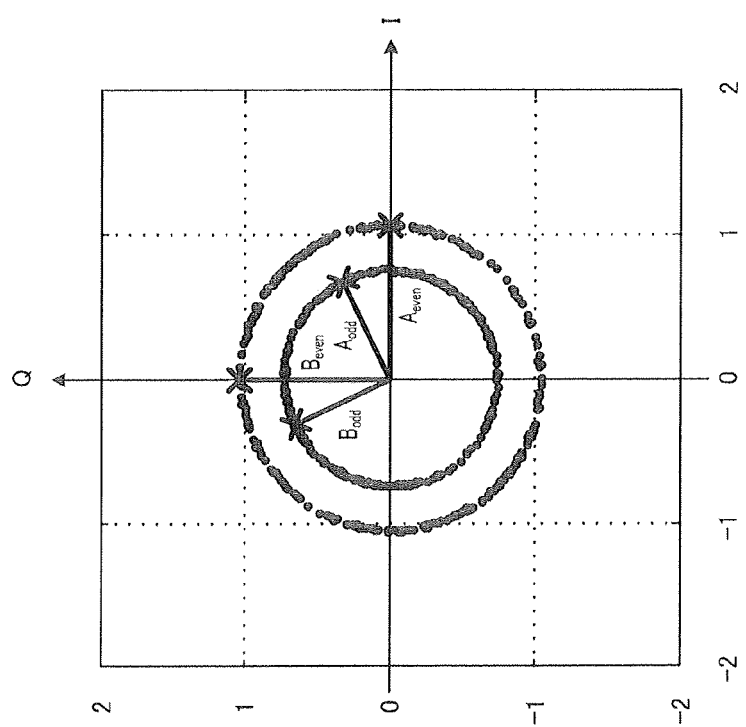
FIG. 22B
FIG. 22A

COMMUNICATION DEVICE AND ORTHOGONAL-ERROR CORRECTION METHOD

TECHNICAL FIELD

The present invention relates to technology for correcting an orthogonal error in communication equipment that performs orthogonal modulation and demodulation.

BACKGROUND ART

Communication equipment that involves orthogonal modulation and demodulation may generate orthogonal errors in processes in an orthogonal modulator and an orthogonal demodulator due to incomplete analogue circuits. The orthogonal errors include a gain error, which represents a difference in gain between I and Q channels, and a phase error, which represents a phase difference between the I and Q channels other than 90°.

An improved design accuracy of an analogue circuit to reduce such orthogonal error generally increases the circuit size and power consumption, and thus cannot be readily built in a battery-driven mobile terminal, which has a limited space. Thus, orthogonal error correction technology by digital signal processing is preferably applied to mobile terminals.

A typical conventional technique that corrects orthogonal errors by digital signal processing is described in, for example, in Patent Literature 1. The communication apparatus described in the Patent Literature 1 supplies locally-generated signals having different phases in each other to an orthogonal modulator and an orthogonal demodulator. The communication apparatus then separates an orthogonal error in the orthogonal modulator from that in the orthogonal demodulator, and estimates and corrects the individual errors, by means of the dependency of signal-point mapping on phase rotation. Patent Literature 1 discloses a method for solving a multi-dimensional non-linear equation through digital signal processing for separating the orthogonal error in the orthogonal modulator from that in the orthogonal demodulator.

CITATION LIST

Patent Literature

PTL 1
Japanese Patent Application Laid-Open No. 2008-22243

SUMMARY OF INVENTION

Technical Problem

However, such a communication apparatus has five error parameters: the gain and phase errors in an orthogonal modulator, the gain and phase errors in an orthogonal demodulator, and the phase error in a phase shifter. This requires the solution of at least a fifth-order nonlinear equation, which requires a large calculation load. An increased calculation load causes the digital circuit size and power consumption to increase, thereby precluding the application of the communication apparatus to mobile terminals.

Accordingly, it is an object of the present invention to provide a communication apparatus that can separate the orthogonal error in an orthogonal modulator from that in an orthogonal demodulator and correct these errors, through a simple calculation, and a method of correcting the orthogonal errors.

Solution to Problem

An aspect of the communication apparatus in accordance with the present invention includes: a locally-generated signal generating section that generates a first locally-generated signal and a second locally-generated signal; an orthogonally modulating section that orthogonally modulates a baseband signal using the first locally-generated signal to generate a modulated signal; an orthogonally demodulating section that orthogonally demodulates the modulated signal using the second locally-generated signal to generate a demodulated signal; a first orthogonal error correcting section that corrects a first orthogonal error that occurs in the orthogonally modulating section; a second orthogonal error correcting section that corrects a second orthogonal error that occurs in the orthogonally demodulating section; an orthogonal error detecting section that detects the first or second orthogonal error based on an amplitude of the demodulated signal; and an orthogonal error correction controlling section that controls the setting of the first or second orthogonal error correcting section in accordance with a result of detection by the orthogonal error detecting section.

An aspect of the orthogonal error correction method in accordance with the present invention is an orthogonal error correction method for correcting an orthogonal error in the communication apparatus including an orthogonal modulator, an orthogonal demodulator, and an orthogonal error correcting unit that corrects an orthogonal error in the orthogonal modulator or in the orthogonal demodulator, the orthogonal error correction method including: generating a first locally-generated signal and a second locally-generated signal; orthogonally modulating the first locally-generated signal to generate a modulated signal; orthogonally demodulating a baseband signal using the modulated signal using the second locally-generated signal to generate a demodulated signal; correcting a first orthogonal error that occurs in the orthogonal modulator and correcting a second orthogonal error that occurs in the orthogonal demodulator; detecting the first or second orthogonal error based on an amplitude of the demodulated signal; and controlling the setting of the first or second orthogonal error correcting unit in accordance with a result of detection by the first or second orthogonal error.

Advantageous Effects of Invention

According to the present invention, the orthogonal error in an orthogonal modulator and the orthogonal error in an orthogonal demodulator can be separated and corrected through a simple calculation, thereby reducing the circuit size and power consumption.

BRIEF DESCRIPTION OF DRAWINGS

FIGS. 22A and 22B illustrates received signal points before and after correction of the gain error in an orthogonal modulator.

DESCRIPTION OF EMBODIMENTS (Principle)

Prior to the description on a specific configuration and operation of an embodiment, a point which is found by the present inventors and leads to the invention will be described. Specifically, the impact of the orthogonal error in an orthogonal modulator, the orthogonal error in an orthogonal demodulator, and the frequency error in locally-generated signals in the orthogonal modulator and in the orthogonal demodulator on received signal points on an IQ plane will be described. In the following description, the modulation scheme used is π/2-shift Binary Phase Shift Keying (BPSK).

Figure 1:
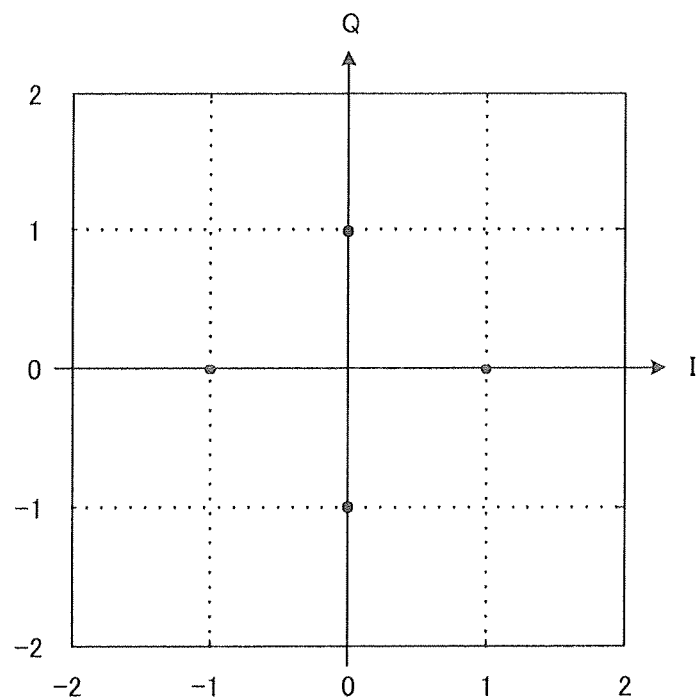
FIG. 1 illustrates received signal points in an orthogonal modulator and an orthogonal demodulator that have no orthogonal error.

FIG. 1 illustrates ideal received signal points having no orthogonal error in an orthogonal modulator, no orthogonal error in an orthogonal demodulator, or no frequency error in a locally-generated signal. In this case, all the signal points having equal amplitudes are located on the I axis or on the Q axis.

Figure 2:
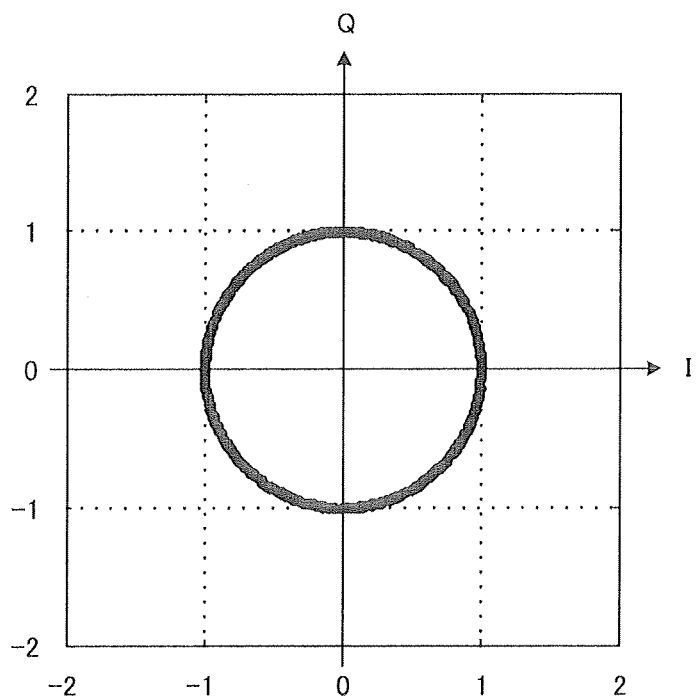
FIG. 2 illustrates received signal points when locally-generated signals in the orthogonal modulator and in the orthogonal demodulator have a frequency error in the case of FIG. 1.

FIG. 2 illustrates received signal points when a frequency error is added to locally-generated signals in the orthogonal modulator and in the orthogonal demodulator. The frequency error refers to a difference in frequency component between the locally-generated signal in the orthogonal modulator and that in the orthogonal demodulator. If the locally-generated signals in the orthogonal modulator and in the orthogonal demodulator have a frequency error, the IQ plane in the orthogonal demodulator rotates relative to the IQ plane in the orthogonal modulator. This results in the rotation of the received signal points about the point of origin on the IQ plane, thereby creating a circular trajectory, as shown in FIG. 2.

Figure 3:
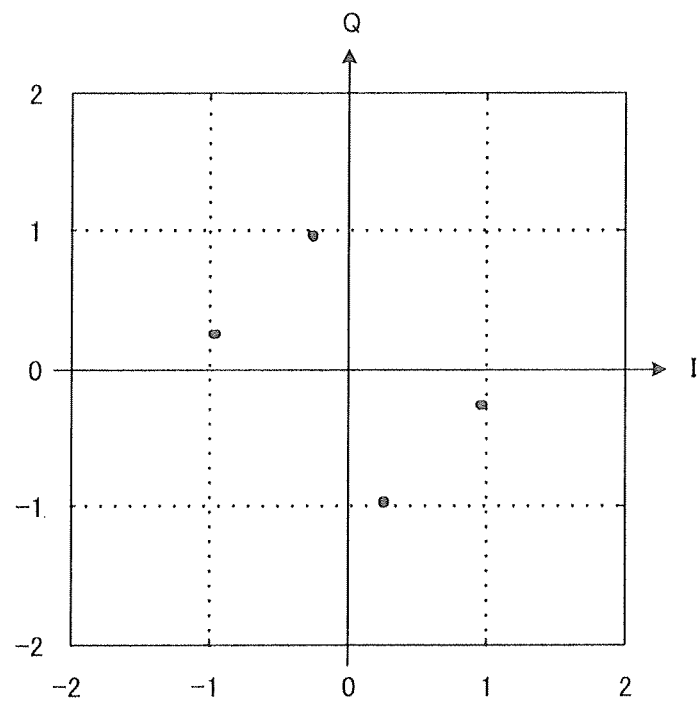
FIG. 3 illustrates received signal points in an orthogonal modulator that has a phase error.

FIG. 3 illustrates received signal points when the orthogonal modulator is supplied with only a phase error. If the orthogonal modulator has a phase error, a signal is sent with a phase difference other than 90° between the I channel (a signal component in the I axis direction) and the Q channel (a signal component in the Q axis). This results in the received signal points being observed at positions deviated from the I and Q axes, as shown in FIG. 3.

Figure 4:
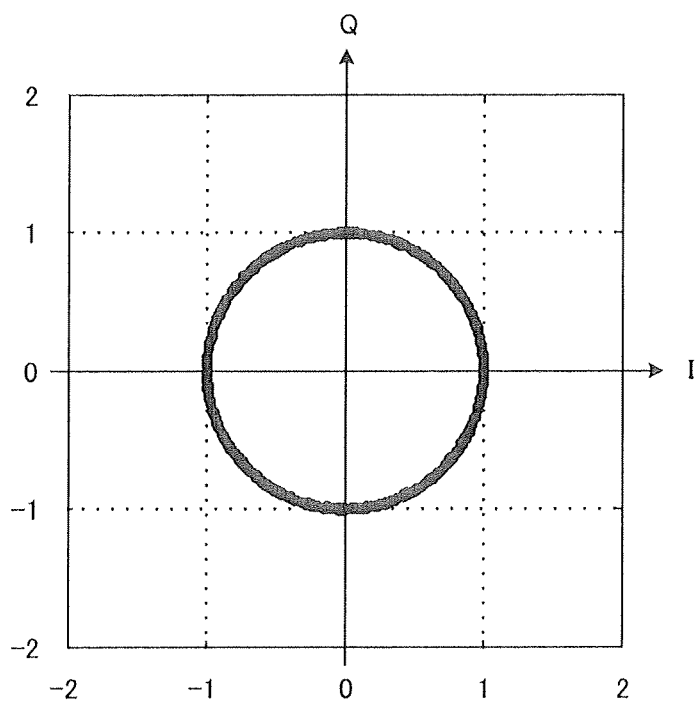
FIG. 4 illustrates received signal points when locally-generated signals in the orthogonal modulator and in the orthogonal demodulator have a frequency error in the case of FIG. 3.

FIG. 4 illustrates received signals when the orthogonal modulator is supplied with a phase error and a frequency error is added to the locally-generated signal. In this case, the received signal points create a trajectory as shown in FIG. 4. In spite of the phase error in the orthogonal modulator, the distances from the point of origin on the IQ plane to received signal points are equal. Since the radius is equal, the received signal points create a circular trajectory, just as in FIG. 2.

Figure 5:
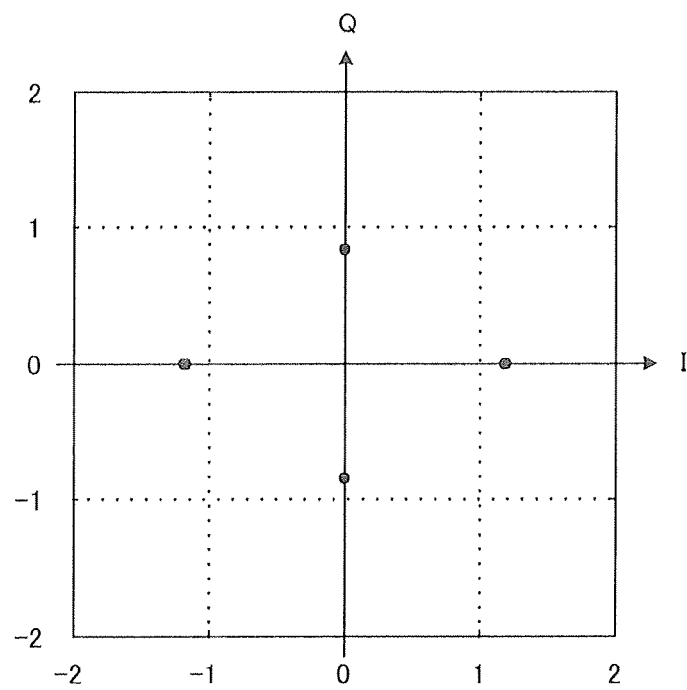
FIG. 5 illustrates received signal points in an orthogonal modulator that has a gain error.

FIG. 5 illustrates received signal points when the orthogonal modulator is supplied with only a gain error. FIG. 5 illustrates a gain in the I channel which is larger than that in the Q channel.

Figure 6:
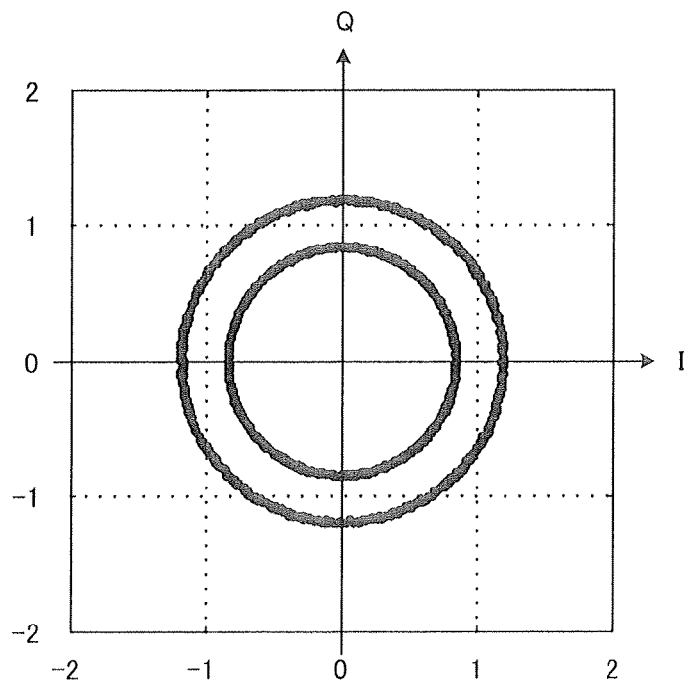
FIG. 6 illustrates received signal points when locally-generated signals in the orthogonal modulator and in the orthogonal demodulator have a frequency error in case of FIG. 5

FIG. 6 illustrates received signals when the orthogonal modulator is supplied with only a gain error and a frequency error is added to a locally-generated signal. In this case, the received signal points create trajectories of two concentric circles having different radii, as shown in FIG. 6. This is because of a difference in gain between I and Q channels, that is, a difference in radius between the trajectory created by the signal points on the I axis and that created by the signal points on the Q axis. In FIG. 6, the circle having a larger radius is a trajectory for the I channel, while the circle having a smaller radius is a trajectory for the Q channel.

Figure 7:
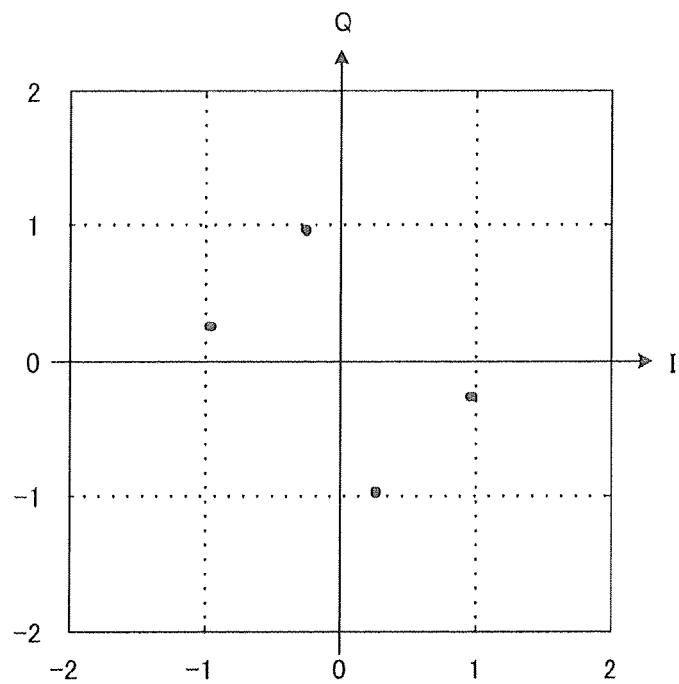
FIG. 7 illustrates received signal points in an orthogonal demodulator that has a phase error.

FIG. 7 illustrates received signal points when the orthogonal demodulator is supplied with only a phase error. In this case, a phase difference between I and Q channels of the orthogonal demodulator is not 90°, which results in received signal points being observed at positions deviated from the I and Q axes.

Figure 8:
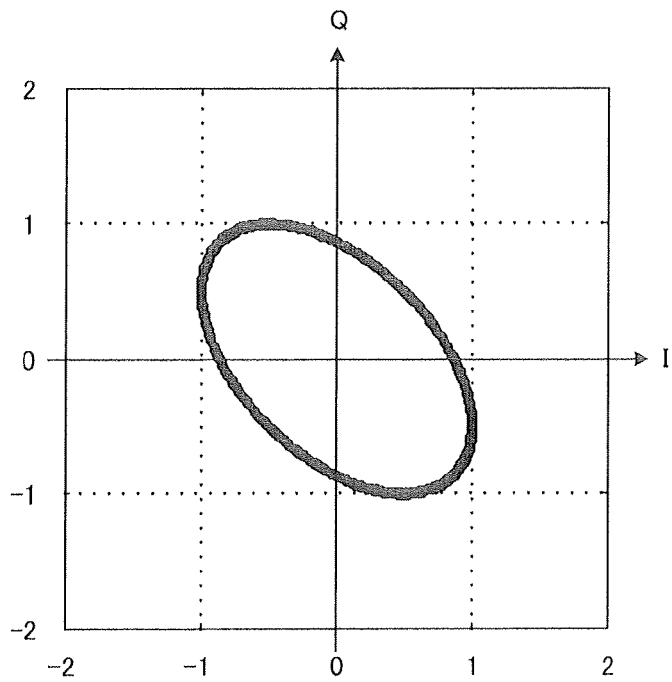
FIG. 8 illustrates received signal points when locally-generated signals in the orthogonal modulator and in the orthogonal demodulator have a frequency error in case of FIG. 7.

FIG. 8 illustrates received signals when the orthogonal demodulator is supplied with a phase error and a frequency error is added to the locally-generated signal. In this case, received signal points forms an ellipse, as shown in FIG. 8. The received signal points rotate about the point of origin on the IQ plane, just as in FIG. 4, and create an elliptical trajectory affected by the phase error. The long and short axes of the ellipse are inclined by a certain angle (45°) from the I and Q axes, respectively. It is known that the angle at which the long and short axes of an ellipse are inclined relative to the I and Q axes, respectively, due to the impact of a phase error is constant at 45°, regardless of the magnitude of phase error.

Figure 9:
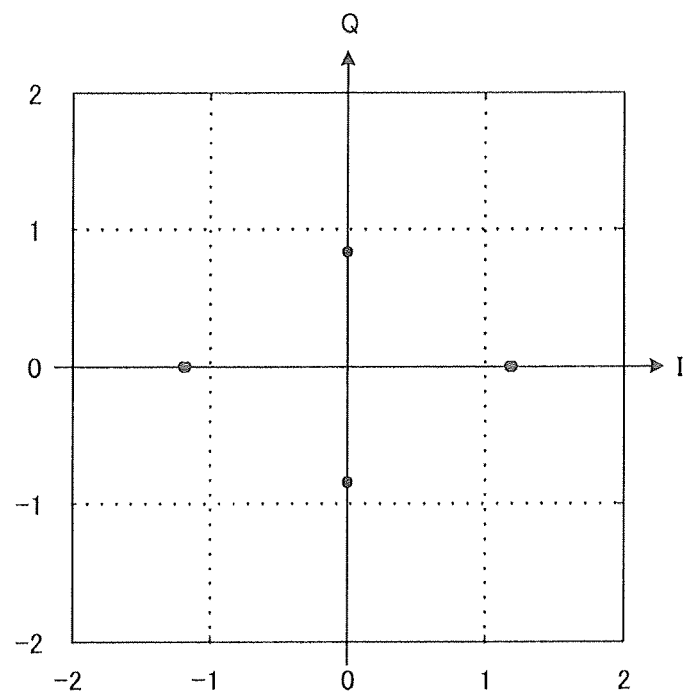
FIG. 9 illustrates received signal points in an orthogonal demodulator that has a gain error.

FIG. 9 illustrates received signal points when the orthogonal demodulator is supplied with only a gain error. FIG. 9 illustrates a gain in the I channel which is larger than that in the Q channel.

Figure 10:
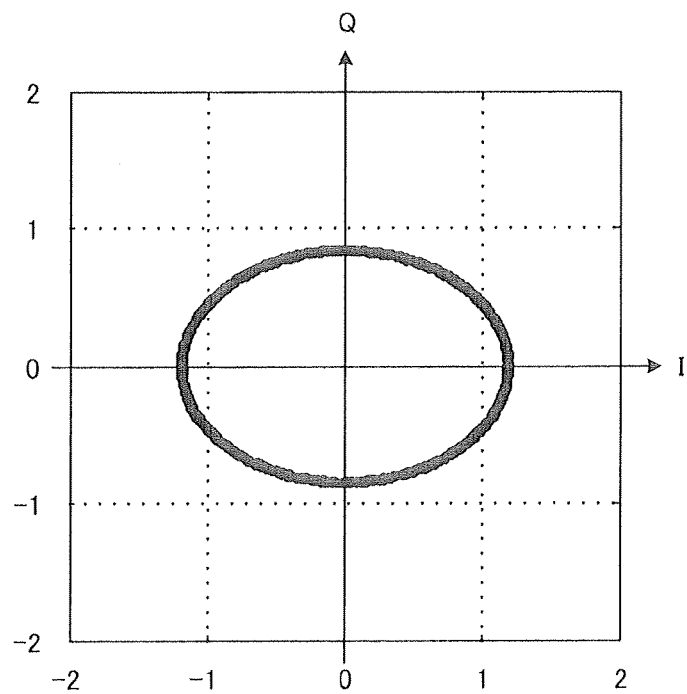
FIG. 10 illustrates received signal points when locally-generated signals in the orthogonal modulator and in the orthogonal demodulator have a frequency error in case of FIG. 9.

FIG. 10 illustrates received signals when the orthogonal demodulator is supplied with a gain error and a frequency error is added to the locally-generated signal. In this case, the received signal points forms an ellipse, as shown in FIG. 10. Unlike FIG. 6, the trajectory created by the received signal points does not form two concentric circles but one ellipse. The long and short axes of the ellipse agree with the I and Q axes, respectively.

Figure 11:
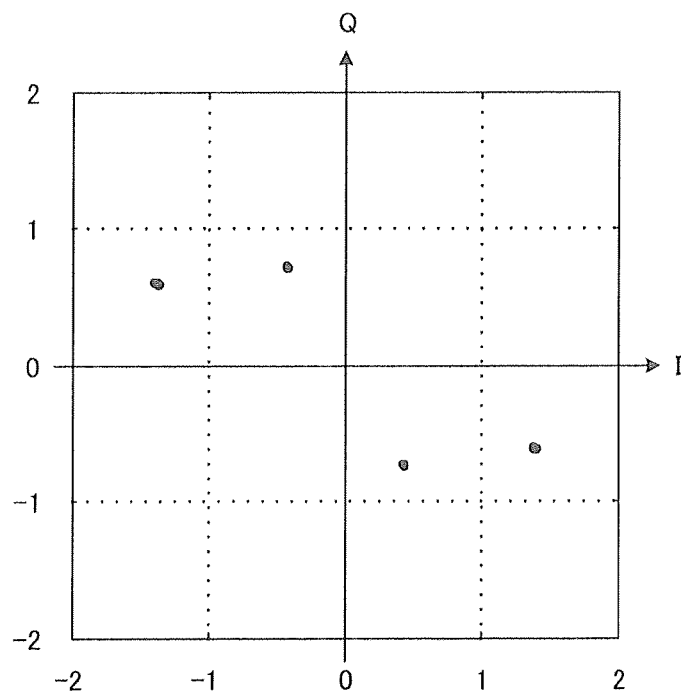
FIG. 11 illustrates received signal points in an orthogonal modulator and an orthogonal demodulator that have phase and gain errors.

FIG. 11 illustrates received signal points when the orthogonal modulator and the orthogonal demodulator are supplied with phase and gain errors.

Figure 12:
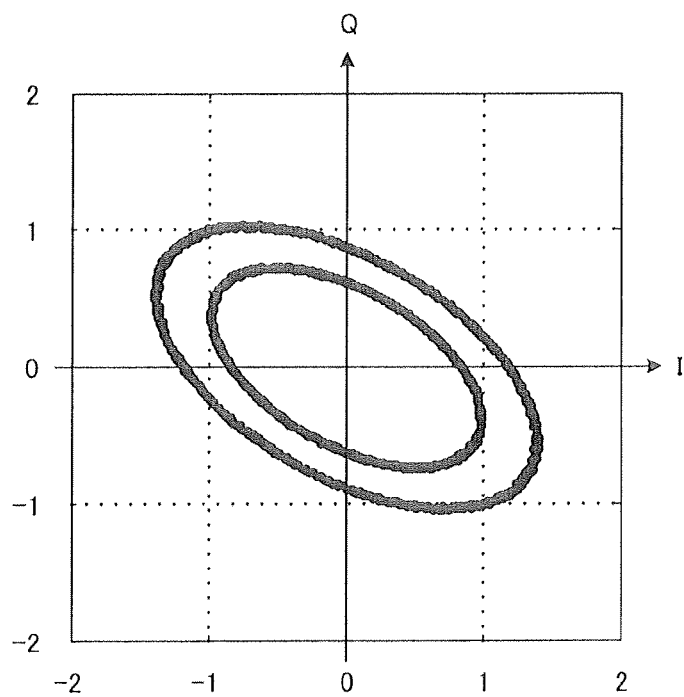
FIG. 12 illustrates received signal points when locally-generated signals in the orthogonal modulator and in the orthogonal demodulator have a frequency error in case of FIG. 11.

FIG. 12 illustrates received signal points when the orthogonal modulator and the orthogonal demodulator are supplied with phase and gain errors, and a frequency error is added to the locally-generated signal. In this case, the received signal points result in trajectories of two concentric ellipses, as shown in FIG. 12, with the long and short axes of the ellipse being inclined relative to the I and Q axes, respectively. The angle at which the long and short axes of an ellipse are inclined relative to the I and Q axes deviates from 45°, depending on the gain errors in the I and Q directions.

All the phase and gain errors in the orthogonal modulator and the orthogonal demodulator are combined in a demodulated signal. As described in FIG. 1 to FIG. 12, the impact of the phase and gain errors in the orthogonal modulator and the phase and gain errors in the orthogonal demodulator on the received signal points depends on the presence or absence of a frequency error in locally-generated signals in the orthogonal modulator and the orthogonal demodulator. The present inventors have focused the impact of the presence or absence of a frequency error in locally-generated signals in an orthogonal modulator and in an orthogonal demodulator on received signal points, and have found that the phase and gain errors in the orthogonal modulator and the orthogonal demodulator can be separated and corrected individually, by taking advantage of these signal characteristics.

An embodiment in accordance with the present invention will now be described with reference to the drawings.

Embodiment

Figure 13:
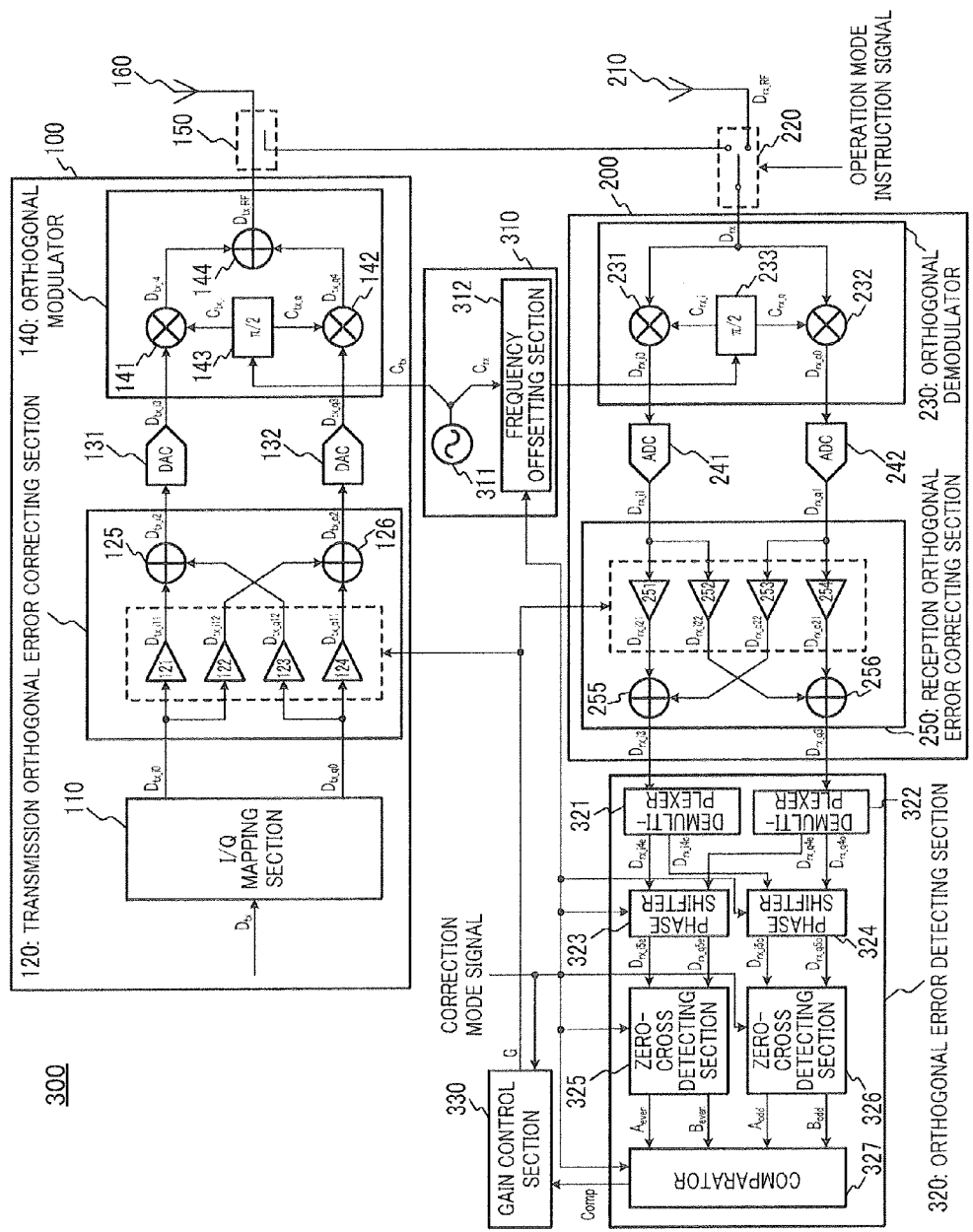
FIG. 13 is a block diagram illustrating the mainframe configuration of a communication apparatus in accordance with an embodiment.

FIG. 13 is a block diagram illustrating the mainframe configuration of a communication apparatus in accordance with the present embodiment. Communication apparatus 300 shown in FIG. 13 includes I/Q mapping section 110, transmission orthogonal error correcting section (Tx IQ imbalance correction section) 120, digital-to-analog converters (DACs) 131, 132, orthogonal modulator 140, coupler 150, transmitting antenna 160, locally-generated signal generating section 310, receiving antenna 210, switch 220, orthogonal demodulator 230, analog-to-digital converters (ADCs) 241, 242, reception orthogonal error correcting section 250, orthogonal error detecting section 320, and gain control section 330.

I/Q mapping section 110, transmission orthogonal error correcting section 120, DACs 131, 132, and orthogonal modulator 140 constitute transmitting circuit 100 in communication apparatus 300. Orthogonal demodulator 230, ADCs 241, 242 and reception orthogonal error correcting section (Rx IQ imbalance correction section) 250 constitute receiving circuit 200 in communication apparatus 300.

Figure 14:
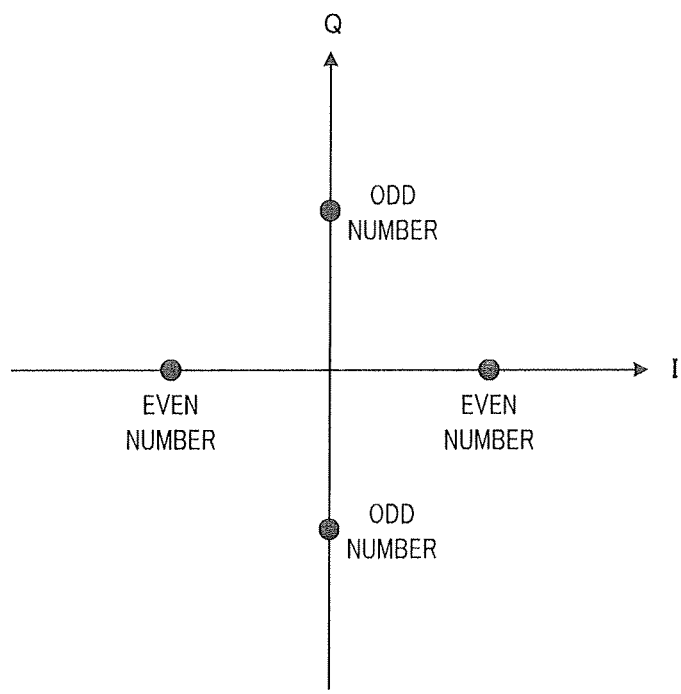
FIG. 14 illustrates a received signal constellation for π/2-shift BPSK modulated signals.

I/Q mapping section 110 allocates input data $D_{tx}$ on the IQ plane in accordance with a given digital modulation scheme and outputs it as orthogonal base band signals $D_{tx\_i0}$ for the I channel and orthogonal base band signals $D_{tx\_q0}$ for the Q channel. In this embodiment, I/Q mapping section 110 uses a π/2-shift BPSK as a digital modulation scheme. In the π/2-shift BPSK, modulated signals are disposed on the I and Q axes alternatively for every symbol. In this embodiment, I/Q mapping section 110 maps even-numbered modulated signals on the I axis and odd-numbered modulated signals on the Q axis, as shown in FIG. 14. I/Q mapping section 110 outputs orthogonal base band signals $D_{tx\_i0}$ and $D_{tx\_q0}$ thus mapped on the IQ plane to transmission orthogonal error correcting section 120.

Transmission orthogonal error correcting section 120 includes variable gain amplifiers 121, 122, 123, 124 and adders 125, 126 to correct an orthogonal error generated in orthogonal modulator 140 described below.

Variable gain amplifiers 121, 122 amplifies orthogonal base band signal $D_{tx\_i0}$. Variable gain amplifier 121 outputs amplified orthogonal base band signal $D_{tx\_i0}$ as signal $D_{tx\_i11}$ to adder 125. Variable gain amplifier 122 outputs amplified orthogonal base band signal $D_{tx\_i0}$ to adder 126 as signal $D_{tx\_i12}$.

Variable gain amplifiers 123, 124 amplifies orthogonal base band signal $D_{tx\_q0}$. Variable gain amplifier 123 outputs amplified orthogonal base band signal $D_{tx\_q0}$ to adder 125 as signal $D_{tx\_q12}$. Variable gain amplifier 124 outputs amplified orthogonal base band signal $D_{tx\_q0}$ as signal $D_{tx\_q11}$ to adder 126.

The gains in variable gain amplifiers 121, 122, 123, 124 are controlled by gain control section 330 described below.

Adder 125 adds signal $D_{tx\_i11}$ and signal $D_{tx\_q12}$ and outputs the added signal to DAC 131 as $D_{tx\_i2}$.

Adder 126 adds signal $D_{tx\_i12}$ and signal $D_{tx\_q11}$ and outputs the added signal to DAC 132 as $D_{tx\_q2}$.

Thus, transmission orthogonal error correcting section 120 corrects an orthogonal error that occurs in orthogonal modulator 140 by amplifying orthogonal base band signals $D_{tx\_i0}$ and $D_{tx\_q0}$ and adding the amplified signals. Details on the orthogonal error correction method in transmission orthogonal error correcting section 120 will be described below.

DACs 131, 132 convert signals $D_{tx\_i2}$, $D_{tx\_q2}$ to analogue signals $D_{tx\_i3}$, $D_{tx\_q3}$, and output them to orthogonal modulator 140.

Locally-generated signal generating section 310 includes local oscillator 311 and frequency offsetting section 312.

Local oscillator 311 generates locally-generated signals $C_{tx}$, $C_{rx}$, outputs locally-generated signal $C_{tx}$ to phase shifter 143 in orthogonal modulator 140 and outputs locally-generated signal $C_{rx}$ to frequency offsetting section 312.

Frequency offsetting section 312 adjusts the frequency of either locally-generated signal $C_{tx}$ or $C_{rx}$ generated by local oscillator 311. In FIG. 13, frequency offsetting section 312 adjusts the frequency of locally-generated signal $C_{rx}$.

More specifically, frequency offsetting section 312 adjusts the frequency of locally-generated signal $C_{rx}$ in accordance with a correction mode indicated by a correction mode signal. The correction mode signal is a signal indicating: [1] a mode that corrects a gain error in orthogonal demodulator 230; [2] a mode that corrects a phase error in orthogonal demodulator 230; [3] a mode that corrects a gain error in orthogonal modulator 140; or [4] a mode that corrects a phase error in orthogonal modulator 140.

If the correction mode signal indicates the mode [1], [2] or [3], frequency offsetting section 312 adds a frequency error to locally-generated signal $C_{rx}$ to differentiate the frequencies of locally-generated signals $C_{tx}$, $C_{rx}$. If the correction mode signal indicates the mode [4], frequency offsetting section 312 does not add a frequency error to locally-generated signal $C_{rx}$ and generates locally-generated signals $C_{tx}$, $C_{rx}$ having the same frequency.

Thus, frequency offsetting section 312 generates locally-generated signals $C_{tx}$, $C_{rx}$ in accordance with the correction mode signal, and outputs locally-generated signal $C_{tx}$ to phase shifter 143 in orthogonal modulator 140 and locally-generated signal $C_{rx}$ to phase shifter 233 in orthogonal demodulator 230.

Orthogonal modulator 140 includes mixers 141, 142, phase shifter 143, and adder 144 to perform orthogonal modulation.

Phase shifter 143 receives locally-generated signal $C_{tx}$ and outputs locally-generated signal $C_{tx}$ to mixer 141 as locally-generated signal $C_{tx\_i}$. Phase shifter 143 generates and outputs locally-generated signal $C_{tx\_q}$ having a phase different from that of locally-generated signal $C_{tx}$ by 90° ($\pi/2$) to mixer 142.

Mixer 141 multiplies orthogonal base band signal $D_{tx\_i3}$ and locally-generated signal $C_{tx\_i}$ and outputs the multiplied signal $D_{tx\_i4}$ to adder 144.

Mixer 142 multiplies orthogonal base band signal $D_{tx\_q3}$ and locally-generated signal $C_{tx\_q}$ and outputs the multiplied signal $D_{tx\_q4}$ to adder 144.

Adder 144 adds signal $D_{tx\_i4}$ and $D_{tx\_q4}$, which are output from mixers 141, 142 respectively, to generate orthogonally modulated signal $D_{tx\_RF}$.

Thus, orthogonal modulator 140 performs orthogonal modulation. Orthogonal modulator 140 has an orthogonal error due to incomplete phase shifter 143, an individual difference between mixers 141 and 142, and a difference in path length between the I and Q channels. In this embodiment, the orthogonal error is corrected by transmission orthogonal error correcting section 120.

Orthogonally modulated signal $D_{tx\_RF}$ generated by orthogonal modulator 140 is transmitted to the communication apparatus of a communication destination (not shown) via transmitting antenna 160.

Coupler 150 extracts and outputs orthogonally modulated signal $D_{tx\_RF}$ to switch 220 in communication apparatus 300.

Switch 220 selects, as a signal output to orthogonal demodulator 230, either received signal $D_{rx\_RF}$ from receiving antenna 210 or orthogonally modulated signal $D_{tx\_RF}$ extracted by coupler 150 in accordance with an operation mode instruction signal. The operation mode instruction signal indicates the operation mode, i.e., a communication mode or feedback mode. The communication mode refers to a communication mode of communication apparatus 300 with a communication apparatus (not shown) whereas the feedback mode refers to a correction mode of the orthogonal error by communication apparatus 300.

More specifically, if the operation mode is the communication mode, switch 220 selects received signal $D_{rx\_RF}$ from receiving antenna 210. If the operation mode is the feedback mode, switch 220 selects orthogonally modulated signal $D_{tx\_RF}$ extracted by coupler 150. Thus, switch 220 switches signals to be demodulated in receiving circuit 200, in accordance with an operation mode instruction signal indicating the communication mode or feedback mode. A signal output from switch 220 is hereinafter indicated as received signal $D_{rx}$.

Orthogonal demodulator 230 includes mixers 231, 232 and phase shifter 233 to perform orthogonal demodulation.

Phase shifter 233 receives locally-generated signal $C_{rx}$ and outputs locally-generated signal $C_{rx}$ to mixer 231 as locally-generated signal $C_{rx\_i}$. Phase shifter 233 generates and outputs locally-generated signal $C_{rx\_q}$ having a phase different from that of locally-generated signal $C_{rx\_i}$ by 90° ($\pi/2$) to mixer 232.

Mixers 231, 232 perform orthogonal demodulation by multiplying received signal $D_{rx}$ from switch 220 and locally-generated signals $C_{rx\_i}$, $C_{rx\_q}$. Received signal $D_{rx}$ is signal $D_{rx\_RF}$ received via antenna 210 or orthogonally modulated signal $D_{tx\_RF}$ received from coupler 150. Received signal $D_{rx}$ is selected by switch 220.

Thus, orthogonal demodulator 230 performs orthogonal demodulation to obtain orthogonal base band signal $D_{rx\_i0}$ for the I channel and orthogonal base band signal $D_{rx\_q0}$ for the Q channel from received signal $D_{rx}$ as demodulated signals. Phase shifter 233 shifts the phases of locally-generated signals $C_{rx\_i}$, $C_{rx\_q}$ by 90° from each other. Orthogonal demodulator 230 also has an orthogonal error due to incomplete phase shifter 233, an individual difference between mixers 231 and 232, and a difference in path length between the I and Q channels. In this embodiment, the orthogonal error is corrected by reception orthogonal error correcting section 250.

Each of ADCs 241, 242 samples orthogonal base band signals $D_{rx\_i0}$ and $D_{rx\_q0}$ at a given sampling rate to convert them to digital signals $D_{rx\_i1}$ and $D_{rx\_q1}$. In this embodiment, it is assumed that the sampling rate equals to a symbol rate for input signals.

Reception orthogonal error correcting section 250 includes variable gain amplifiers 251, 252, 253, 254 and adders 255, 256 to correct an orthogonal error in orthogonal demodulator 230.

Variable gain amplifiers 251, 252 amplify orthogonal base band signal $D_{rx\_i1}$. Variable gain amplifier 251 outputs amplified orthogonal base band signal $D_{rx\_i1}$ to adder 255 as signal $D_{rx\_i21}$. Variable gain amplifier 252 outputs amplified orthogonal base band signal $D_{rx\_i1}$ to adder 256 as signal $D_{rx\_i22}$.

Variable gain amplifiers 253, 254 amplify orthogonal base band signal $D_{rx\_q1}$. Variable gain amplifier 253 outputs amplified orthogonal base band signal $D_{rx\_q1}$ to adder 255 as signal $D_{rx\_q22}$. Variable gain amplifier 254 outputs amplified orthogonal base band signal $D_{rx\_q1}$ to adder 256 as signal $D_{rx\_q21}$.

The gains in variable gain amplifiers 251, 252, 253, 254 are controlled by gain control section 330 described below:

Adder 255 adds signal $D_{rx\_i21}$ and signal $D_{rx\_q22}$ and outputs the added signal to orthogonal error detecting section 320 as signal $D_{rx\_i3}$.

Adder 256 adds signal $D_{rx\_i22}$ and signal $D_{rx\_q21}$ and outputs the added signal to orthogonal error detecting section 320 as signal $D_{rx\_q3}$.

Thus, reception orthogonal error correcting section 250 corrects an orthogonal error that occurs in orthogonal demodulator 230 by amplifying orthogonal base band signals $D_{rx\_i1}$ and $D_{rx\_q1}$ and adding the amplified signals. Details on the orthogonal error correction method in reception orthogonal error correcting section 250 will be described below.

Orthogonal error detecting section 320 includes demultiplexers 321, 322, phase shifters 323, 324, zero-cross detecting sections 325, 326, and comparator 327, and detects an orthogonal error that occurs in orthogonal modulator 140 and orthogonal demodulator 230.

Demultiplexer 321 sorts orthogonal base band signals $D_{rx\_i3}$ into even-numbered signals $D_{rx\_i4e}$ and odd-numbered signals $D_{rx\_i4o}$. Demultiplexer 321 outputs even-numbered signals $D_{rx\_i4e}$ to phase shifter 323 and odd-numbered signals $D_{rx\_i4o}$ to phase shifter 324.

Demultiplexer 322 sorts orthogonal base band signals $D_{rx\_q3}$ into even-numbered signals $D_{rx\_q4e}$ and odd-numbered signals $D_{rx\_q4o}$. Demultiplexer 322 outputs even-numbered signals $D_{rx\_q4e}$ to phase shifter 323 and odd-numbered signals $D_{rx\_q4o}$ to phase shifter 324.

FIG. 15A indicates trajectories created by orthogonal base band signals $D_{rx\_i3}$, $D_{rx\_q3}$ input to demultiplexers 321, 322. FIG. 15B indicates a trajectory created by the even-numbered signals $D_{rx\_i4e}$, $D_{rx\_q4e}$, which were sorted by demultiplexers 321, 322. FIG. 15C indicates a trajectory created by the odd-numbered signals $D_{rx\_i4o}$, $D_{rx\_q4o}$, which were sorted by demultiplexers 321, 322.

Figure 15:
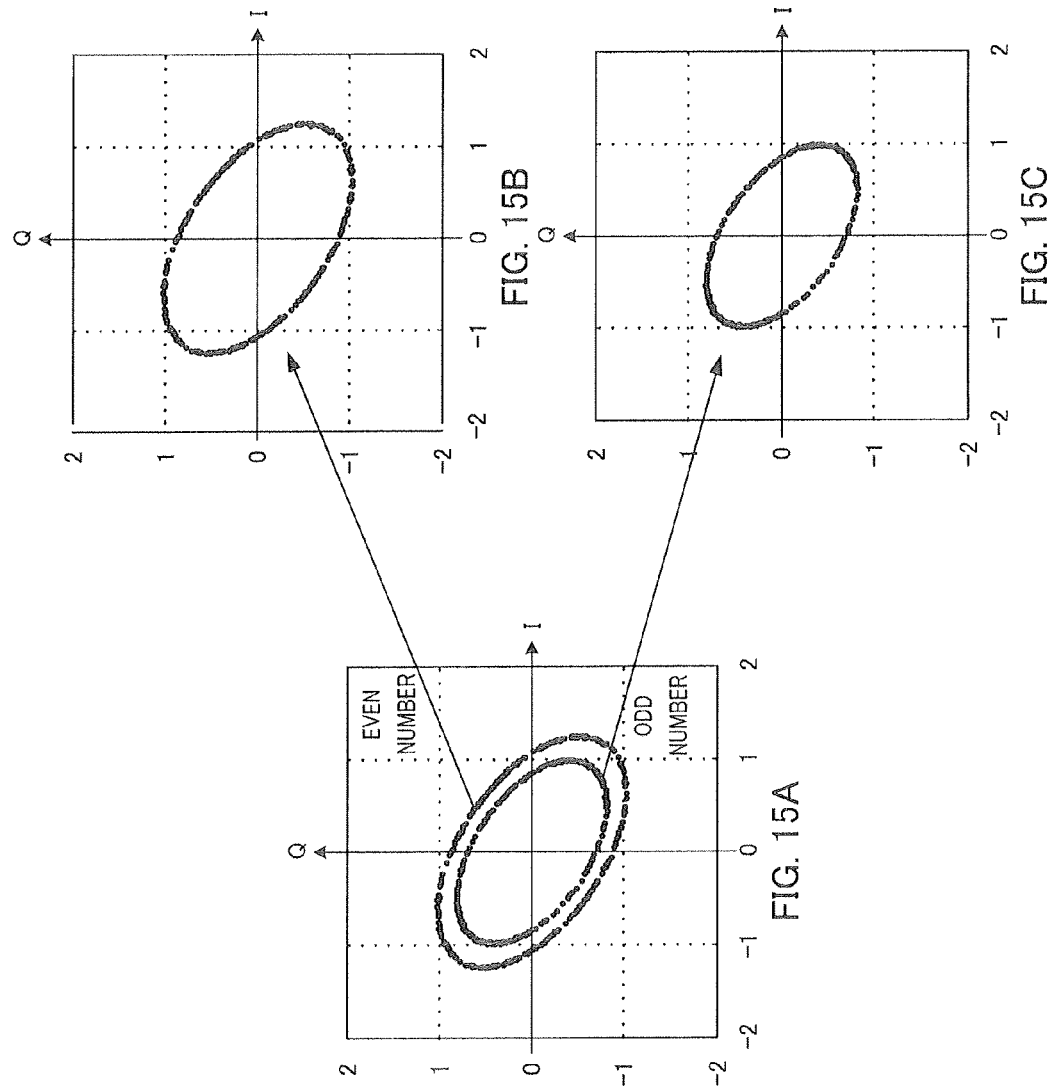
FIGS. 15A-C illustrates received signal points before and after separation by a demultiplexer.

In this embodiment, I/Q mapping section 110 in transmitting circuit 100 maps even-numbered signals to the I axis and odd-numbered signals to the Q axis. Demultiplexers 321, 322 sort the received signals corresponding to those mapped to the I and Q axes upon transmission. Thus, demultiplexers 321, 322 can separate the received signal points in the form of two concentric ellipses into two ellipses, as shown in FIG. 15.

Phase shifters 323, 324 adjust the phases of the two types of orthogonal base band signals separated by demultiplexers 321, 322 in accordance with the correction mode indicated by a correction mode signal. In this embodiment, the shift angle of the phase is controlled by phase shifters 323, 324 to, for example, 0° or 45°, depending on the correction mode, where 45° is a tilt angle at which the long and short axes of the eclipse created by the received signal points affected by a phase error are tilted toward the I and Q axes. The correspondence relationship between the correction mode and the shift angle of the phase controlled is described below.

Phase shifter 323 controls the phases of signals $D_{rx\_i4e}$, $D_{rx\_q4e}$ and outputs the phase-controlled signals $D_{rx\_i5e}$, $D_{rx\_q5e}$ to zero-cross detecting section 325.

Phase shifter 324 controls the phases of signals $D_{rx\_i4o}$, $D_{rx\_q4o}$ and outputs the phase-controlled signals $D_{rx\_i5o}$, $D_{rx\_q5o}$ to zero-cross detecting section 326.

Zero-cross detecting section 325 detects amplitude $A_{even}$ at a zero crossing point at which the trajectory created by signals $D_{rx\_i5e}$, $D_{rx\_q5e}$ intersects with the I axis, and amplitude $B_{even}$ at a zero crossing point at which the trajectory created by signals $D_{rx\_i5e}$, $D_{rx\_q5e}$ intersects with the Q axis.

Similarly, zero-cross detecting section 326 detects amplitude $A_{odd}$ at a zero crossing point at which the trajectory created by signals $D_{rx\_i5o}$, $D_{rx\_q5o}$ intersects with the I axis and amplitude $B_{odd}$ at a zero crossing point at which the trajectory created by signals $D_{rx\_i5o}$, $D_{rx\_q5o}$ intersects with the Q axis.

Figure 16:
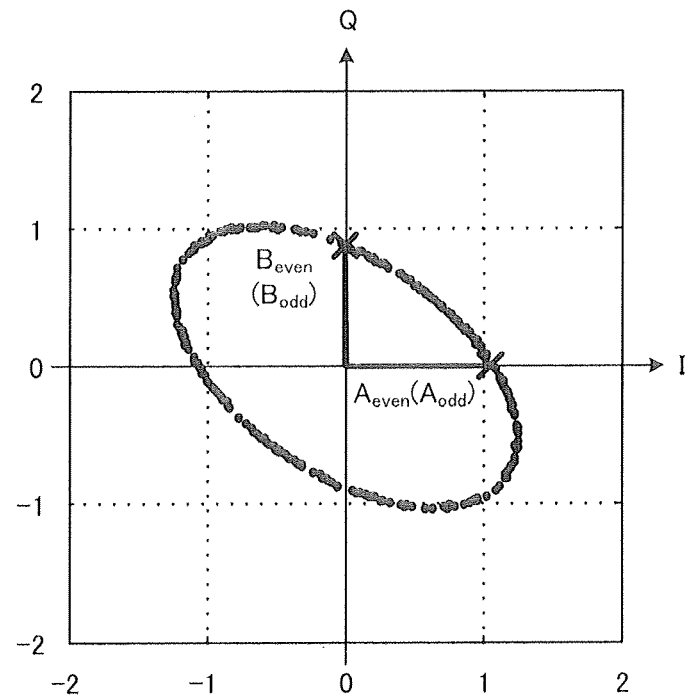
FIG. 16 illustrates received signal points and the amplitudes at the points intersecting with the I and Q axes (zero crossing points)

FIG. 16 shows an exemplary trajectory created by signals $D_{rx\_i5e}$, $D_{rx\_q5e}$ (or signals $D_{rx\_i5o}$, $D_{rx\_q5o}$) and exemplary amplitudes $A_{even}$, $B_{even}$ (or amplitudes $A_{odd}$, $B_{odd}$).

Zero-cross detecting section 325 outputs the detected amplitudes $A_{even}$, $B_{even}$ to comparator 327. Zero-cross detecting section 326 outputs the detected amplitudes $A_{odd}$, $B_{odd}$ to comparator 327.

Comparator 327 compares any two combinations of amplitudes $A_{even}$, $A_{odd}$, $B_{even}$, $B_{odd}$, and 0. More specifically, comparator 327 selects a pair of amplitudes to be compared in accordance with a correction mode signal indicating a correction mode. Amplitudes to be compared in each correction mode are described below. Comparator 327 outputs the result, Comp, of comparison of the amplitudes in the selected pair to gain control section 330.

Gain control section 330 controls gains in variable gain amplifiers 121, 122, 123, 124 in transmission orthogonal error correcting section 120 and those in variable gain amplifiers 251, 252, 253, 254 in reception orthogonal error correcting section 250 based on the result, Comp, of the comparison in comparator 327. The control method in gain control section 330 is described below:

The correction operation of an orthogonal error by communication apparatus 300 having the configuration described above will now be described in details. Communication apparatus 300 in accordance with this embodiment separates and corrects an orthogonal error in orthogonal modulator 140 and that in orthogonal demodulator 230 individually.

Figure 18:
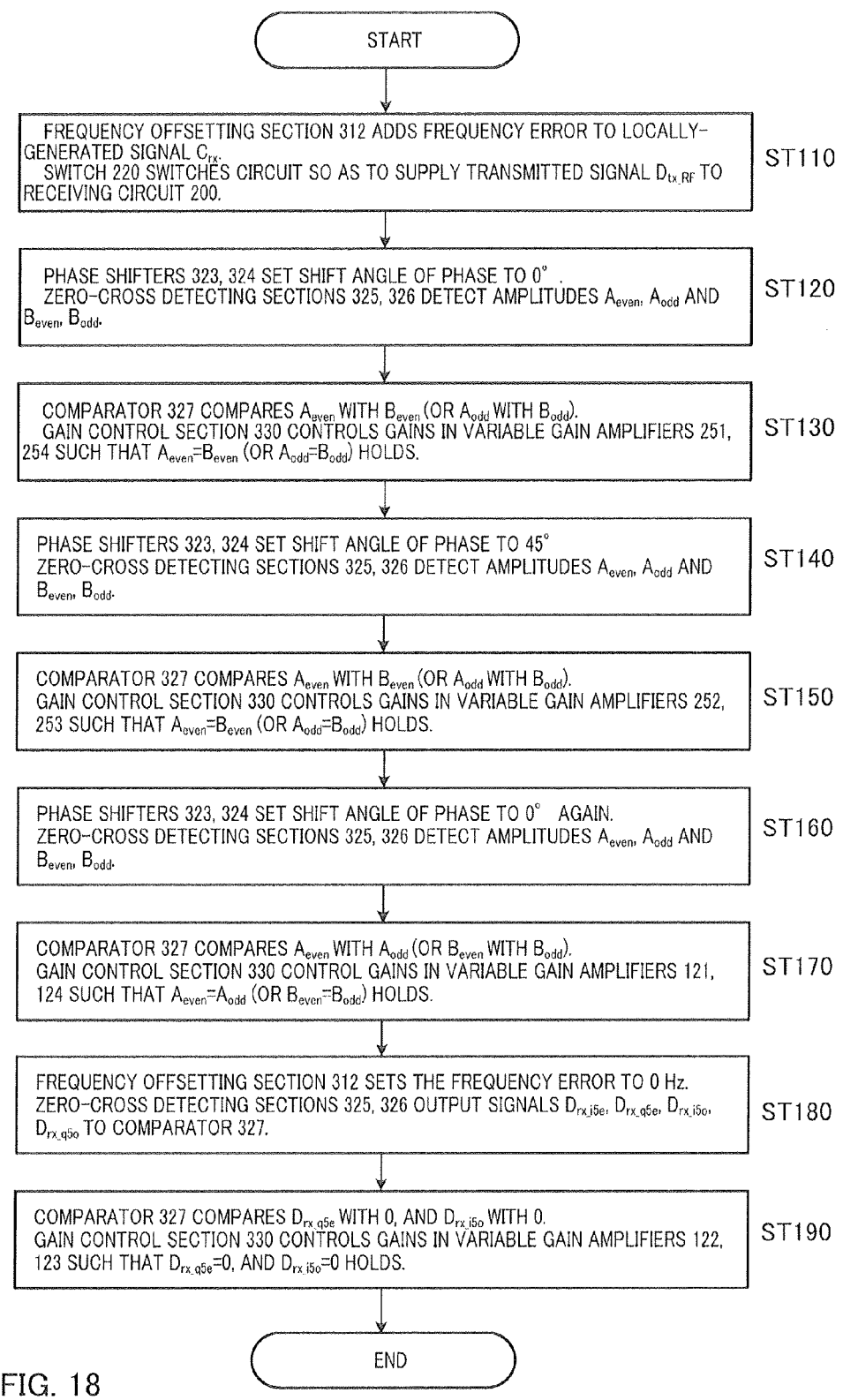
FIG. 18 is a flowchart illustrating an orthogonal error correction.

FIG. 18 is a flowchart indicating an orthogonal error correction process. ST in the flowchart indicates each step in the flow.

ST110: frequency offsetting section 312 adds a frequency error to locally-generated signal $C_{rx}$. Namely, locally-generated signal generating section 310 sets the frequency of locally-generated signal $C_{tx}$ and that of locally-generated signal $C_{rx}$ to different values. The amount of the frequency error may be set to any value other than 0 Hz. Switch 220 switches the circuit so as to supply orthogonally modulated signal $D_{tx\_RF}$ extracted by coupler 150 to receiving circuit 200 in communication apparatus 300.

[1] Correction of a Gain Error in Orthogonal Demodulator 230

Figure 17:
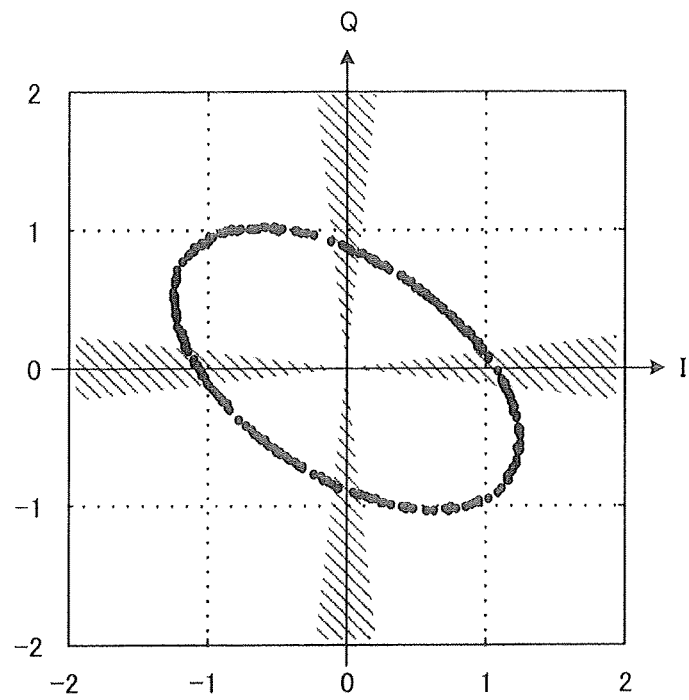
FIG. 17 shows an exemplary method for detecting a zero crossing point.

ST120: phase shifters 323, 324 set the shift angle of the phase to 0°. Zero-cross detecting sections 325, 326 detect amplitudes $A_{even}$, $A_{odd}$ and $B_{even}$, $B_{odd}$ at zero crossing points at which the trajectory created by received signal points intersects with the I and Q axes. Note that the intersection may be detected in any manner; zero-cross detecting section 325 may, for example, detect a signal point with $D_{rx\_q5e}=0$ and detect the I component of the signal point as amplitude $A_{even}$. Alternatively, zero-cross detecting sections 325, 326 may preliminary set zero-cross regions on the IQ plane, as shown in the shaded regions in FIG. 17, and detect the average of the amplitudes for the trajectory created by received signal points, the trajectory being in the zero-cross regions, as an amplitude at a zero crossing point.

ST130: comparator 327 compares $A_{even}$ with $B_{even}$. Alternatively, comparator 327 compares $A_{odd}$ with $B_{odd}$. Gain control section 330 controls gains in variable gain amplifiers 251, 254 such that the result, Comp, of comparison in comparator 327 indicates $A_{even}=B_{even}$ (or $A_{odd}=B_{odd}$).

Figure 19:
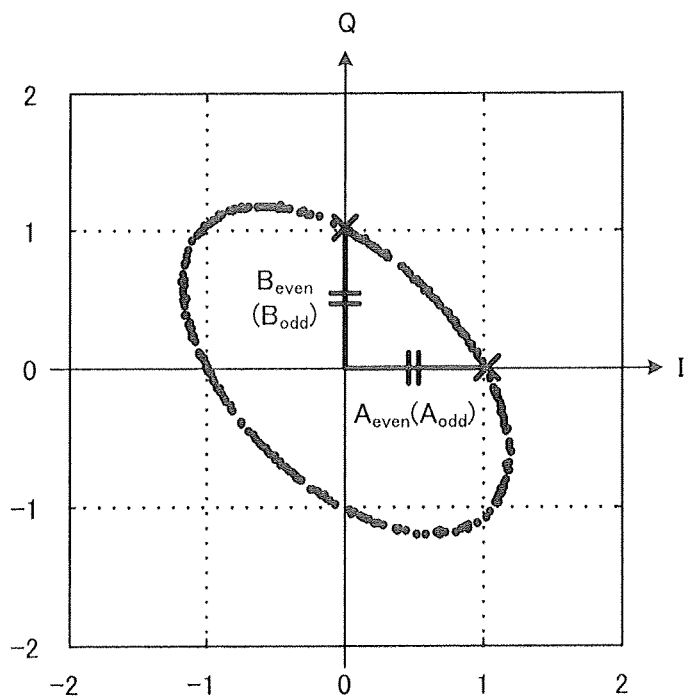
FIG. 19 illustrates received signal points after correction of the gain error in an orthogonal demodulator.

FIG. 19 indicates a trajectory created by received signal points when gain control section 330 controls gains in variable gain amplifiers 251, 254 such that the gains result in $A_{even}=B_{even}$ (or $A_{odd}=B_{odd}$).

In this embodiment, gain control section 330 can employ any control process. For example, if the result Comp of comparison indicates $A_{even}>B_{even}$, gain control section 330 may set the amount of the gain controlled in variable gain amplifier 251 to −3 dB, and the amount of the gain controlled in variable gain amplifier 254 to +3 dB. Namely, gain control section 330 may perform an opposite gain control for the I and Q channels. Alternatively, gain control section 330 may fix the gain in variable gain amplifier 254 while controlling only the gain in variable gain amplifier 251. Namely, gain control section 330 may fix the gain in the variable gain amplifier for either the I or Q channel, while controlling the gain in the variable gain amplifier only for the other channel.

Thus, gain control section 330 corrects a gain error in orthogonal demodulator 230.

[2] Correction of a Phase Error in Orthogonal Demodulator 230

ST140: phase shifters 323, 324 set the shift angle of the phase to 45°, where 45° is an inclination angle at which the long and short axes of the eclipse created by the received signal points affected by a phase error are inclined relative to the I and Q axes.

Similarly to ST120, zero-cross detecting sections 325, 326 detect amplitudes $A_{even}$, $A_{odd}$ and $B_{even}$, $B_{odd}$ at zero crossing points at which the trajectory created by received signal points intersects with the I and Q axes.

Figure 20:
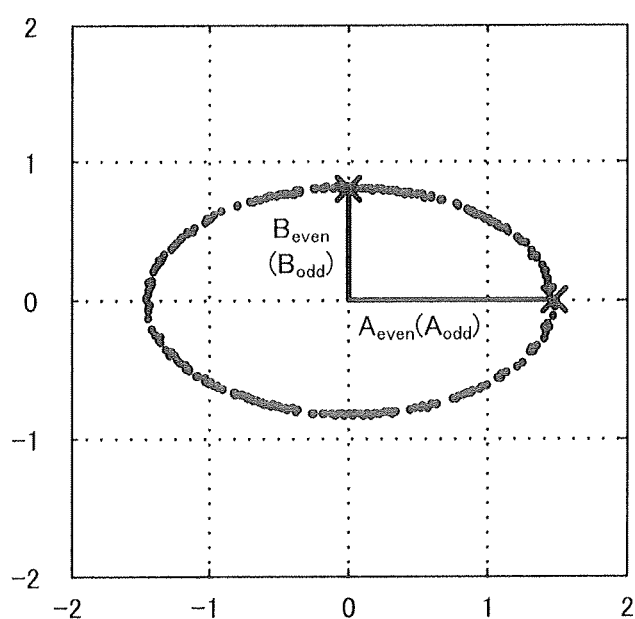
FIG. 20 illustrates received signal points obtained by rotating the phase of those shown in FIG. 19 counterclockwise by 45°.

FIG. 20 shows an exemplary trajectory created by signal $D_{rx\_i5e}$, $D_{rx\_q5e}$ (or signals $D_{rx\_i5o}$, $D_{rx\_q5o}$) and exemplary amplitudes $A_{even}$, $B_{even}$ (or amplitudes $A_{odd}$, $B_{odd}$). Since the shift angle of the phase in phase shifters 323, 324 is set to 45° at ST140, the trajectory shown in FIG. 20 is obtained by rotating the trajectory in FIG. 19 by 45°.

ST150: comparator 327 compares $A_{even}$ with $B_{even}$. Alternatively, comparator 327 compares $A_{odd}$ with $B_{odd}$. Gain control section 330 controls gains in variable gain amplifiers 252, 253 such that the result Comp of comparison in comparator 327 results in $A_{even}=B_{even}$ (or $A_{odd}=B_{odd}$).

Figure 21:
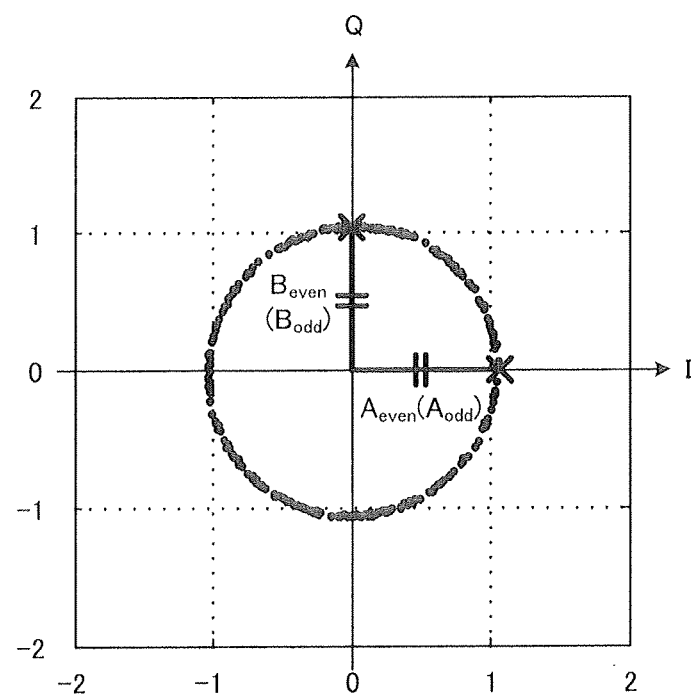
FIG. 21 illustrates received signal points after correction of the phase error in an orthogonal demodulator.

FIG. 21 shows a trajectory created by received signal points when gain control section 330 controls gains in variable gain amplifiers 252, 253 such that the gains result in $A_{even}=B_{even}$ (or $A_{odd}=B_{odd}$).

In this embodiment, gain control section 330 can employ any controlling process. For example, if the result Comp of comparison indicates $A_{even}>B_{even}$, gain control section 330 may set the amount of the gain controlled in variable gain amplifier 252 to +1 dB, and the amount of the gain controlled in variable gain amplifier 253 to +1 dB. Namely, gain control section 330 may perform the same gain control for the I and Q channels.

Thus, gain control section 330 corrects a phase error in orthogonal demodulator 230.

[3] Correction of a Gain Error in Orthogonal Modulator 140

ST160: phase shifters 323, 324 set the shift angle of the phase to 0° again. Similarly to ST120, zero-cross detecting sections 325, 326 detect amplitudes $A_{even}$, $A_{odd}$ and $B_{even}$, $B_{odd}$ at zero crossing points at which the trajectory created by received signal points intersects with the I and Q axes.

ST170: comparator 327 compares $A_{even}$ with $A_{odd}$. Alternatively, comparator 327 compares $B_{even}$ with $B_{odd}$. Gain control section 330 controls gains in variable gain amplifiers 121, 124 such that the result Comp of comparison in comparator 327 results in $A_{even}=A_{odd}$ (or $B_{even}=B_{odd}$).

FIG. 22A shows a trajectory created by received signal points before the gains in variable gain amplifiers 121, 124 are controlled. FIG. 22B shows a trajectory created by received signal points after the gains in variable gain amplifiers 121, 124 are controlled. Namely, gain control section 330 controls the gains in variable gain amplifiers 121, 124 such that the detached two circles have the same radius, as shown in FIG. 22B.

In this embodiment, gain control section 330 can employ any controlling process. For example, if the result Comp of comparison indicates $A_{even}>A_{odd}$, gain control section 330 may set the amount of the gain controlled in variable gain amplifier 121 to −3 dB, and the amount of the gain controlled in variable gain amplifier 124 to +3 dB. Namely, gain control section 330 may perform an opposite gain control for the I and Q channels. Alternatively, gain control section 330 may fix the gain in variable gain amplifier 124 while controlling only the gain in variable gain amplifier 121. Namely, gain control section 330 may fix the gain in the variable gain amplifier for either the I or Q channel, while controlling the gain in the variable gain amplifier only for other channel.

Thus, gain control section 330 corrects the gain error in orthogonal modulator 140.

[4] Correction of a Phase Error in Orthogonal Modulator 140

ST180: frequency offsetting section 312 sets the frequency error to 0 Hz. Namely, locally-generated signal generating section 310 generates locally-generated signals $C_{tx}$, $C_{rx}$ having an equal frequency. If the amount of frequency offset is set to 0 Hz, and if the frequency of locally-generated signal $C_{tx}$ used in orthogonal modulator 140 equals that of locally-generated signal $C_{rx}$ used in orthogonal demodulator 230, received signal points no longer rotate. At this point, an orthogonal phase error in orthogonal modulator 140 is not corrected, which results in received signal points being observed at locations deviated from the I and Q axes.

Figure 23:
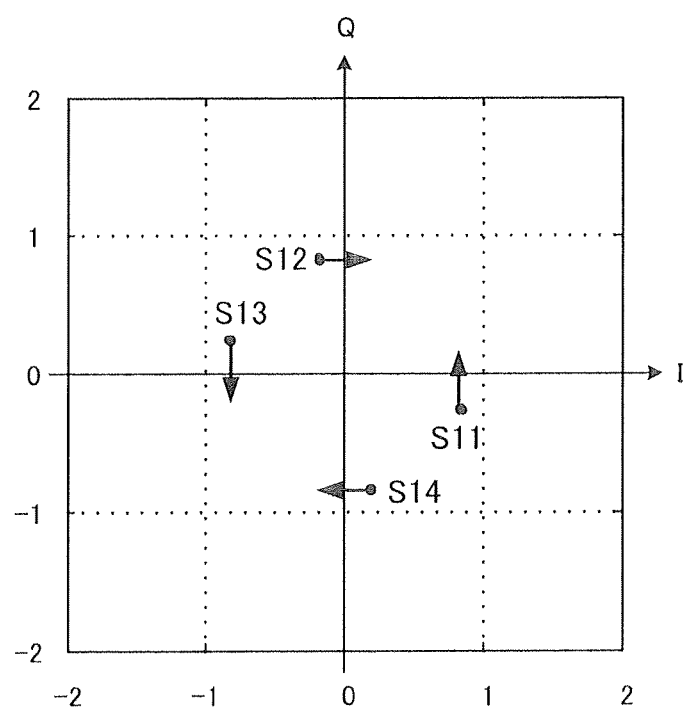
FIG. 23 illustrates an exemplary correction of the phase error in an orthogonal modulator.

FIG. 23 illustrates received signal points when the frequency of locally-generated signal $C_{tx}$ equals that of locally-generated signal $C_{rx}$. In FIG. 23, signal points S11, S13 are those for even-numbered modulated signals mapped to the I axis on the transmission side. In FIG. 23, signal points S12, S14 are those for odd-numbered modulated signals mapped to the Q axis on the transmission side. The coordinates of signal points S11, S13 are $(D_{rx\_i5e}, D_{rx\_q5e})$. The coordinates of signal points S12, S14 are $(D_{rx\_i5o}, D_{rx\_q5o})$.

At ST180, zero-cross detecting sections 325, 326 output signals $D_{rx\_i5e}$, $D_{rx\_q5e}$, $D_{rx\_i5o}$, $D_{rx\_q5o}$ to comparator 327 without processing them.

ST190: comparator 327 compares $D_{rx\_q5e}$ with 0. Comparator 327 compares $D_{rx\_i5o}$ with 0. Gain control section 330 controls gains in variable gain amplifiers 122, 123 such that the result, Comp, of comparison in comparator 327 shows $D_{rx\_q5e}=0$ and $D_{rx\_i5o}=0$. Namely, gain control section 330 controls the gains in variable gain amplifiers 122, 123 such that the imaginary parts of S11, S13 result in 0 ($D_{rx\_q5e}=0$) and the real parts of S12, S14 result in 0 ($D_{rx\_i5o}=0$).

Gain control section 330 corrects signal points S11, S13 in the direction shown by the arrows in FIG. 23 by controlling the gain in variable gain amplifier 122 such that $D_{rx\_q5e}=0$. Gain control section 330 corrects signal points S12, S14 in the direction shown by the arrows in FIG. 23 by controlling the gain in variable gain amplifier 123 such that $D_{rx\_i5o}=0$.

Thus, gain control section 330 corrects a phase error in orthogonal modulator 140.

As described above, communication apparatus 300 corrects: [1] the gain error in orthogonal demodulator 230; [2] the phase error in orthogonal demodulator 230; [3] the gain error in orthogonal modulator 140; and [4] the phase error in orthogonal modulator 140.

Communication apparatus 300 may correct only a part of errors [1] to [4], not all of them. For example, if only the gain error [1] in orthogonal demodulator 230 is to be corrected, communication apparatus 300 may perform ST110, ST120 and ST130. If only the phase error [2] in orthogonal demodulator 230 is to be corrected, communication apparatus 300 may perform ST110, ST140 and ST150. If only the gain error [3] in orthogonal modulator 140 is to be corrected, communication apparatus 300 may perform only ST110, ST160 and ST170. If only the phase error [4] in orthogonal modulator 140 is to be corrected, communication apparatus 300 may perform ST180 and ST190.

As described above, in communication apparatus 300 in accordance with this embodiment, orthogonal error detecting section 320 detects an orthogonal error in orthogonal modulator 140 and an orthogonal error in orthogonal demodulator 230 individually based on the amplitude of a demodulated signal. This allows communication apparatus 300 to separate and individually correct the orthogonal error in transmitting circuit 100 and the orthogonal error in receiving circuit 200.

As described above, communication apparatus 300 can correct the orthogonal error by a simple method, that is, comparison of the amplitudes at the zero crossing points at which the trajectory created by received signals intersects with the I and Q axes. Thus, correction can be achieved with a small circuit size and a low power consumption.

In the above description, frequency offsetting section 312 adds a frequency error to locally-generated signal $C_{rx}$, thereby differentiating the frequency of locally-generated signal $C_{tx}$ and that of locally-generated signal $C_{rx}$, which results in rotation of received signal points. The present invention, however, is not limited to this configuration. For example, locally-generated signal generating section 310 may include a phase shifter in place of frequency offsetting section 312 and the phase shifter may rotate received signal points by constantly changing the phase of locally-generated signal $C_{rx}$.

In the above description, the π/2-shift BPSK was used as a modulation scheme, but the modulation scheme is not limited to this. If a modulation scheme other than the π/2-shift BPSK is used, demultiplexers 321, 322 may sort demodulated signals in accordance with a received signal constellation on the IQ plane upon transmission, i.e., a pattern of modulated signals allocated by I/Q mapping section 110 on the I or Q axis. More specifically, demultiplexers 321, 322 may separate demodulated signals into those that were allocated on the I axis upon transmission (first separated signals) and those that were allocated on the Q axis upon transmission (second separated signals) in accordance with the pattern.

Transmission orthogonal error correcting section 120 and reception orthogonal error correcting section 250 can have any configuration without restriction. In this embodiment, gain and phase errors in orthogonal modulator 140 and gain and phase errors in orthogonal demodulator 230 can be corrected individually. Transmission orthogonal error correcting section 120 and reception orthogonal error correcting section 250 may have any configurations provided that they allow correction of these detected errors. For example, in order to correct only the gain error in orthogonal modulator 140, transmission orthogonal error correcting section 120 has variable gain amplifiers 121, 124.

The entire disclosure of Japanese Patent Application No. 2010-204286 filed on Sep. 13, 2010 including specification, claims, drawings and abstract are incorporated herein by reference in its entirety.

INDUSTRIAL APPLICABILITY

The communication apparatus and the method for correcting an orthogonal error in accordance with the present invention can correct an orthogonal error by a simple method of comparing the amplitudes at zero crossing points at which received signals intersects with the I and Q axes. Such correction can be achieved with a small circuit consuming reduced power, and is useful in battery driven communication equipment having a limited space, such as mobile phones.

REFERENCE SIGNS LIST

100 Transmitting circuit
110 I/Q mapping section
120 Transmission orthogonal error correcting section
121, 122, 123, 124, 251, 252, 253, 254 Variable gain amplifier
125, 126, 144, 255, 256 Adder
131, 132 DAC
140 Orthogonal modulator
141, 142, 231, 232 Mixer
143, 233, 323, 324 Phase shifter
150 Coupler
160 Transmitting antenna
200 Receiving circuit
210 Receiving antenna
220 Switch
230 Orthogonal demodulator
241, 242 ADC
250 Reception orthogonal error correcting section
300 Communication apparatus
310 Locally-generated signal generating section
320 Orthogonal error detecting section
321, 322 Demultiplexer
325, 326 Zero-cross detecting section
327 Comparator
330 Gain control section

The invention claimed is:

1. A communication apparatus, comprising:
a locally-generated signal generating section that generates a first locally-generated signal and a second locally-generated signal;
an orthogonally modulating section that orthogonally modulates a baseband signal using the first locally-generated signal to generate a modulated signal;
an orthogonally demodulating section that orthogonally demodulates the modulated signal using the second locally-generated signal to generate a demodulated signal;
a first orthogonal error correcting section that corrects a first orthogonal error that occurs in the orthogonally modulating section;
a second orthogonal error correcting section that corrects a second orthogonal error that occurs in the orthogonally demodulating section;
an orthogonal error detecting section that detects the first or second orthogonal error based on an amplitude of the demodulated signal; and
an orthogonal error correction controlling section that controls a setting of the first or second orthogonal error correcting section in accordance with a result of detection by the orthogonal error detecting section, wherein the orthogonal error detecting section comprises:
a separating section that separates the demodulated signal into a first separated signal disposed on an I axis in a transmission and a second separated signal disposed on a Q axis in the transmission, in accordance with a received signal constellation on an IQ plane in the transmission;
a separated signal phase-shifting section that adjusts phases of the first separated signal and the second separated signal;
a zero cross point detecting section that detects amplitudes of a first zero crossing point at which the first separated signal intersects with the I axis, a second zero crossing point at which the first separated signal intersects with the Q axis, a third zero crossing point at which the second separated signal intersects with the I axis, and a fourth zero crossing point at which the second separated signal intersects with the Q axis; and
a comparing section that compares the amplitudes of the first to fourth zero crossing points,
wherein the orthogonal error detecting section detects the orthogonal error based on a result of comparison of the amplitudes of the first to fourth zero crossing points.

2. The communication apparatus according to claim 1, wherein:

the locally-generated signal generating section generates the second locally-generated signal having a frequency that is different from a frequency of the first locally-generated signal;

the separated signal phase-shifting section sets a shift angle of phase to 0°; and the orthogonal error correction controlling section controls the setting of the second orthogonal error correcting section such that the amplitude at the first zero crossing point equals the amplitude of the second zero crossing point, or the amplitude at the third zero crossing point equals the amplitude of the fourth zero crossing point.

3. The communication apparatus according to claim 1, wherein:

the locally-generated signal generating section generates the second locally-generated signal having a frequency that is different from a frequency of the first locally-generated signal;

the separated signal phase-shifting section sets a shift angle of phase to 45°; and the orthogonal error correction controlling section controls the setting of the second orthogonal error correcting section such that the amplitude at the first zero crossing point equals the amplitude of the second zero crossing point, or the amplitude at the third zero crossing point equals the amplitude of the fourth zero crossing point.

4. The communication apparatus according to claim 1, wherein:

the locally-generated signal generating section generates the second locally-generated signal having a frequency that is different from a frequency of the first locally-generated signal;

the separated signal phase-shifting section sets a shift angle of phase to 0°; and the orthogonal error correction controlling section controls the setting of the first orthogonal error correcting section such that the amplitude at the first zero crossing point equals the amplitude of the third zero crossing point, or the amplitude at the second zero crossing point equals the amplitude of the fourth zero crossing point.

5. The communication apparatus according to claim 1, wherein:

the locally-generated signal generating section generates the second locally-generated signal having a frequency that is different from a frequency of the first locally-generated signal;

the separated signal phase-shifting section sets a shift angle of phase to 0°; and the orthogonal error correction controlling section controls the setting of the first orthogonal error correcting section such that a value of an imaginary part of the first separated signal is 0 and a value of a real part of the second separated signal is 0.

6. The communication apparatus according to claim 1, wherein the locally-generated signal generating section comprises a frequency offsetting section that adds a frequency error to the first locally-generated signal to generate the second locally-generated signal.

7. The communication apparatus according to claim 1, wherein the locally-generated signal generating section comprises a phase-shifting section that continuously changes a phase of the first locally-generated signal to generate the second locally-generated signal.

8. An orthogonal error correction method for correcting an orthogonal error in a communication apparatus comprising an orthogonal modulator, an orthogonal demodulator, and an orthogonal error correcting unit that corrects an orthogonal error in the orthogonal modulator or in the orthogonal demodulator, the orthogonal error correction method comprising:

generating a first locally-generated signal and a second locally-generated signal;

orthogonally modulating a baseband signal using the first locally-generated signal to generate a modulated signal;

orthogonally demodulating the modulated signal using the second locally-generated signal to generate a demodulated signal;

correcting a first orthogonal error that occurs in the orthogonal modulator;

correcting a second orthogonal error that occurs in the orthogonal demodulator;

detecting the first or second orthogonal error based on an amplitude of the demodulated signal; and controlling a setting of the first or second orthogonal error correcting unit in accordance with a result of detection by the first or second orthogonal error, wherein the detecting the first or second orthogonal error comprises:

separating the demodulated signal into a first separated signal disposed on an I axis in a transmission and a second separated signal disposed on a Q axis in the transmission, in accordance with a received signal constellation on an IQ plane in the transmission;

adjusting phases of the first separated signal and the second separated signal;

detecting amplitudes of a first zero crossing point at which the first separated signal intersects with the I axis, a second zero crossing point at which the first separated signal intersects with the Q axis, a third zero crossing point at which the second separated signal intersects with the I axis, and a fourth zero crossing point at which the second separated signal intersects with the Q axis;

comparing the amplitudes of the first to fourth zero crossing points; and detecting the orthogonal error based on a result of comparison of the amplitudes of the first to fourth zero crossing points.

* * * * *